United States Patent
Kitagawa et al.

(10) Patent No.: US 12,139,571 B2
(45) Date of Patent: Nov. 12, 2024

(54) OXYGEN-CURABLE SILICONE COMPOSITION AND CURED PRODUCT THEREOF

(71) Applicant: SHIN-ETSU CHEMICAL CO., LTD., Tokyo (JP)

(72) Inventors: Taichi Kitagawa, Annaka (JP); Nobuaki Matsumoto, Annaka (JP); Toshiyuki Ozai, Annaka (JP); Masayuki Ikeno, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/766,850

(22) PCT Filed: Aug. 13, 2020

(86) PCT No.: PCT/JP2020/030738
§ 371 (c)(1),
(2) Date: Apr. 6, 2022

(87) PCT Pub. No.: WO2021/070471
PCT Pub. Date: Apr. 15, 2021

(65) Prior Publication Data
US 2024/0076434 A1 Mar. 7, 2024

(30) Foreign Application Priority Data

Oct. 7, 2019 (JP) .................................. 2019-184270

(51) Int. Cl.
*C08F 299/08* (2006.01)
(52) U.S. Cl.
CPC .................................. *C08F 299/08* (2013.01)
(58) Field of Classification Search
CPC .................................................... C08F 299/08
See application file for complete search history.

(56) References Cited

U.S. PATENT DOCUMENTS

2003/0120005 A1  6/2003  Webb et al.
2007/0298223 A1  12/2007  Loch et al.

FOREIGN PATENT DOCUMENTS

| EP | 3594264 A1 | 1/2020 |
|----|------------|--------|
| JP | 7-216232 A | 8/1995 |
| JP | 2849027 B2 | 1/1999 |
| JP | 2007214543 A * | 8/2007 |
| JP | 2008-527077 A | 7/2008 |
| JP | 2010-163478 A | 7/2010 |
| JP | 2010-280891 A | 12/2010 |

(Continued)

OTHER PUBLICATIONS

International Search Report, issued in PCT/JP2020/030738, PCT/ISA/210, dated Oct. 27, 2020.
(Continued)

*Primary Examiner* — Robert D Harlan
(74) *Attorney, Agent, or Firm* — Birch, Stewart, Kolasch & Birch, LLP

(57) ABSTRACT

Provided is an oxygen-curable silicone composition that cures at room temperature, the reaction being triggered by oxygen in the atmosphere, without requiring heat or UV irradiation at the time of use, and exhibits good mechanical strength after curing.

A composition including (A) an organopolysiloxane (1)

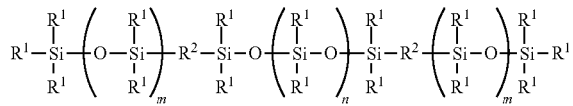

($R^1$ represents an alkyl group or the like but has at least one acryloyloxy group or the like in the molecule, $R^2$ represents an oxygen atom or the like, and m and n represent numbers that satisfy $1 \leq m+n \leq 1,000$.), (B) a silicone resin including (a) a unit of formula (2), (b) an $R^1_3SiO_{1/2}$ unit, and (c) an $SiO_{4/2}$ unit, the molar ratio of [(a)+(b)]/(c) being 0.4-1.2, and the silicone resin having 0.005 mol/100 g or more Si—OH groups

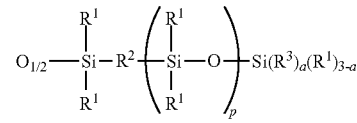

($R^1$ and $R^2$ are the same as above. $R^3$ represents an acryloyloxyalkyl group or the like, p represents 0-10, and l represents a number that satisfies 1-3.), and (C) an organoborane complex (3)

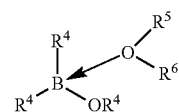

($R^4$-$R^6$ represent hydrocarbon groups.).

4 Claims, No Drawings

(56) References Cited

FOREIGN PATENT DOCUMENTS

| JP | 2014136706 A | * | 7/2014 | |
|---|---|---|---|---|
| JP | 2016190977 A | * | 11/2016 | |
| JP | 2020-12025 A | | 1/2020 | |
| WO | WO-2006073696 A1 | * | 7/2006 | ............ C08F 230/06 |
| WO | WO-2013162738 A1 | * | 10/2013 | ............ A61K 8/0241 |

OTHER PUBLICATIONS

Written Opinion of the International Searching Authority, issued in PCT/JP2020/030738, PCT/ISA/237, dated Oct. 27, 2020.

* cited by examiner

OXYGEN-CURABLE SILICONE COMPOSITION AND CURED PRODUCT THEREOF

TECHNICAL FIELD

The present invention relates to an oxygen-curable silicone composition and a cured product thereof.

BACKGROUND ART

Silicone rubber excels in heat resistance, cold resistance, and electric insulation, and has widely been used for various industries including electric/electronic, automotive, and architectural industries.

As curable compositions capable of giving such silicone rubber, two types of compositions, that is, one-pack type and two-pack type compositions have been known (see Patent Documents 1 and 2). Addition-curable compositions, however, require heating for usage, meanwhile UV-curable compositions (see Patent Document 3) require UV irradiation equipment to be introduced, although usable at normal temperature.

In recent years, production processes have been required to be energy-saving, and materials having both curability at room temperature and mechanical characteristics have been strongly desired to be developed.

PRIOR ART DOCUMENTS

Patent Documents

Patent Document 1: JP 2849027
Patent Document 2: JP-A 2010-163478
Patent Document 3: JP-A H07-216232
Patent Document 4: JP-A 2010-280891

SUMMARY OF INVENTION

Technical Problem

The present invention has been made in view of the above-described circumstances, and an object of the present invention is to provide a silicone composition that needs neither heating nor UV irradiation for usage, cures at room temperature using atmospheric oxygen as a trigger of the reaction, and exhibits good mechanical strength after curing, and to provide a cured product of the silicone composition.

Solution to Problem

As a result of intensive studies to solve the above-described problems, the inventors have found that a composition including a specific organopolysiloxane having a reactive double bond such as an acryloyloxyalkyl group, a specific organoborane complex, and a specific silicone resin having a reactive double bond and a Si—OH group is capable of curing at room temperature without heating or UV irradiation for usage because the polymerization reaction proceeds using atmospheric oxygen as a trigger and that a cured product of the composition exhibits good mechanical strength, and thus the present invention has been completed.

Note that although a composition using an alkylborane-amine complex as a catalyst has been proposed as a composition polymerizable at room temperature (see Patent Document 4), the organoborane complex used in the present invention is not disclosed.

That is, the present invention provides:
1. An oxygen-curable silicone composition including:
   (A) 100 parts by weight of an organopolysiloxane having the general formula (1) described below:

[Chem. 1]

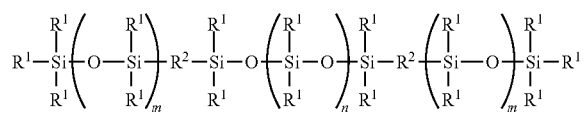

(1)

wherein $R^1$ each independently represents an alkyl group having 1 to 10 carbon atoms, alkenyl group having 2 to 10 carbon atoms, aryl group having 6 to 10 carbon atoms, acryloyloxy group, methacryloyloxy group, acryloyloxyalkyl group, methacryloyloxyalkyl group, acryloyloxyalkyloxy group, or methacryloyloxyalkyloxy group provided that one molecule of the organopolysiloxane includes at least one group selected from acryloyloxy group, methacryloyloxy group, acryloyloxyalkyl group, methacryloyloxyalkyl group, acryloyloxyalkyloxy group, and methacryloyloxyalkyloxy group, $R^2$ each independently represents an oxygen atom, alkylene group having 1 to 10 carbon atoms, or arylene group having 6 to 10 carbon atoms, and m and n represent numbers that are 0 or more and satisfy $1 \leq m+n \leq 1{,}000$;

(B) 1 to 1,000 parts by weight of a silicone resin including (a) a unit having the formula (2) described below, (b) an $R^1{}_3SiO_{1/2}$ unit, and (c) a $SiO_{4/2}$ unit as constitutive units, having a molar ratio of a total of the unit (a) and the unit (b) to the unit (c) in a range of 0.4 to 1.2, and having, per 100 g, 0.005 mol or more of a Si—OH group:

[Chem. 2]

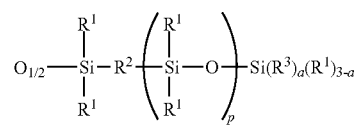

(2)

wherein $R^1$ and $R^2$ are as described above, $R^3$ each independently represents an acryloyloxyalkyl group, methacryloyloxyalkyl group, acryloyloxyalkyloxy group, or methacryloyloxyalkyloxy group, p represents a number satisfying $0 \leq p \leq 10$, and a represents a number satisfying $1 \leq a \leq 3$; and (C) 0.01 to 20 parts by weight of an organoborane complex having the formula (3) described below:

[Chem. 3]

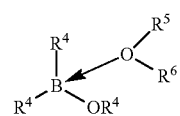

(3)

wherein $R^4$ each independently represents a monovalent hydrocarbon group having 1 to 10 carbon atoms, $R^5$ and $R^6$ each independently represent a hydrocarbon group having 1 to 10 carbon atoms, and $R^5$ and $R^6$ may bond to form a divalent linking group;
2. The oxygen-curable silicone composition of 1, wherein the silicone resin of the component (B) has, per 100 g, 0.007 to 0.03 mol of the Si—OH group;
3. A cured product of the oxygen-curable silicone composition of 1 or 2.

Advantageous Effects of Invention

The oxygen-curable silicone composition of the present invention has curability at room temperature and requires neither heating process nor UV irradiation process for curing. Therefore, the curing process can achieve a time reduction and an energy saving, and does not need introduction of heating equipment and UV irradiation equipment. Furthermore, a cured product of the oxygen-curable silicone composition has good mechanical strength.

The oxygen-curable silicone composition of the present invention having such properties is particularly suitable for applications such as adhesive agents.

DESCRIPTION OF EMBODIMENTS

Hereinafter, the present invention is specifically described.

The oxygen-curable silicone composition of the present invention includes the following components (A) to (C) as essential components.

[1] Component (A)

The component (A) in the oxygen-curable silicone composition of the present invention is an organopolysiloxane having the following formula (1).

[Chem. 4]

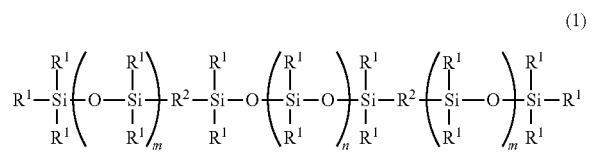

(1)

In the formula (1), $R^1$ each independently represents an alkyl group having 1 to 10 carbon atoms, alkenyl group having 2 to 10 carbon atoms, aryl group having 6 to 10 carbon atoms, acryloyloxy group, methacryloyloxy group, acryloyloxyalkyl group, methacryloyloxyalkyl group, acryloyloxyalkyloxy group, or methacryloyloxyalkyloxy group provided that one molecule of the organopolysiloxane includes at least one group selected from acryloyloxy group, methacryloyloxy group, acryloyloxyalkyl group, methacryloyloxyalkyl group, acryloyloxyalkyloxy group, and methacryloyloxyalkyloxy group, $R^2$ each independently represents an oxygen atom, alkylene group having 1 to 10 carbon atoms, or arylene group having 6 to 10 carbon atoms, and m and n represent numbers that are 0 or more and satisfy $1 \leq m+n \leq 1,000$.

The alkyl group having 1 to 10 carbon atoms represented by $R^1$ may be linear, branched, or cyclic, and specific examples of the alkyl group include methyl, ethyl, n-propyl, n-butyl, n-pentyl, n-hexyl, and n-octyl groups.

The alkenyl group having 2 to 10 carbon atoms may be linear, branched, or cyclic, and specific examples of the alkenyl group include vinyl, allyl (2-propenyl), 1-butenyl, and 1-octenyl groups.

Specific examples of the aryl group having 6 to 10 carbon atoms include phenyl and naphthyl groups.

Some or all of hydrogen atoms on these groups may be substituted by halogen atoms (for example, chlorine atom, bromine atom, fluorine atom).

In particular, 90 mol % or more of the total number of $R^1$ is preferably a methyl group or phenyl group, in consideration of easiness of synthesis and cost.

At least one of $R^1$ is a polymerizable group selected from acryloyloxy group, methacryloyloxy group, acryloyloxyalkyl group, methacryloyloxyalkyl group, acryloyloxyalkyloxy group, and methacryloyloxyalkyloxy group.

The alkyl (alkylene) group in the acryloyloxyalkyl group, methacryloyloxyalkyl group, acryloyloxyalkyloxy group, and methacryloyloxyalkyloxy group is not particularly limited, and is preferably an alkylene group having 1 to 10 carbon atoms, such as a methylene, ethylene, trimethylene, propylene, tetramethylene, pentamethylene, or hexamethylene group, more preferably an alkylene group having 1 to 5 carbon atoms, and even more preferably an ethylene or trimethylene group.

These polymerizable groups may reside at the terminal or in the middle of a molecular chain of the organopolysiloxane, and preferably reside only at the terminal in consideration of flexibility of a cured product to be obtained, and more preferably reside on both terminals.

The alkylene group having 1 to 10 carbon atoms represented by $R^2$ may be linear, branched, or cyclic, and specific examples of the alkylene group include methylene, to ethylene, trimethylene, hexamethylene, cyclohexylene, and octamethylene groups.

Specific examples of the arylene group having 6 to 10 carbon atoms include 1,2-phenylene, 1,3-phenylene, 1,4-phenylene, and naphthylene groups.

In particular, $R^2$ is preferably an oxygen atom, ethylene group, trimethylene group, or 1,4-phenylene group, and more preferably an oxygen atom.

Both m and n are numbers that are 0 or more and satisfy $1 \leq m+n \leq 1,000$, preferably $10 \leq m+n \leq 800$, and more preferably $20 \leq m+n \leq 500$.

If m+n is less than 1, the organopolysiloxane is likely to volatilize, and if m+n is more than 1,000, the composition has high viscosity and poor handleability.

The organopolysiloxane of the component (A) may be used singly or in combination of two or more kinds thereof.

The organopolysiloxane of the component (A) can be produced with a known method. For example, a compound having both a polymerizable group and a hydrosilyl group in one molecule is combined with an organopolysiloxane having a terminal vinyl group using a platinum catalyst to obtain the organopolysiloxane of the component (A). The component (A) may be a mixture of these compounds.

Specific examples of the organopolysiloxane of the component (A) include, but are not limited to, the following compounds.

[Chem.5]

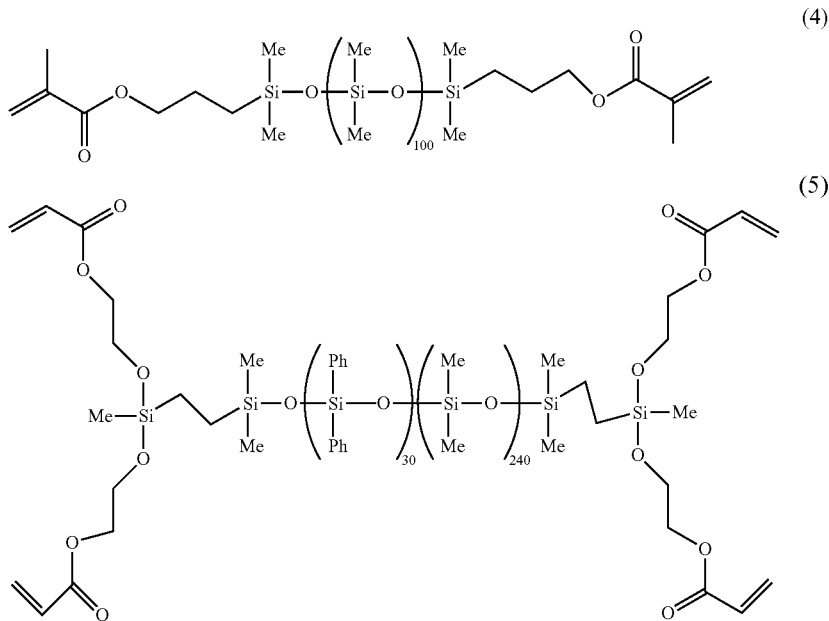

In the formula (5), order of arrangement of siloxane units in parentheses is freely selectable. Me represents a methyl group, and Ph represents a phenyl group.

The organopolysiloxane of the component (A) can be produced with a known method. For example, the organopolysiloxane having the formula (4) is obtainable by reacting dimethylsiloxane with both terminals blocked with dimethylmethacrylsiloxy groups with a cyclic dimethylsiloxane, under acid equilibrium using trifluoromethanesulfonic acid.

The organopolysiloxane having the formula (5) is obtainable by reacting 2-hydroxyethyl acrylate with a hydrosilylation product of a dimethylsiloxane/diphenylsiloxane copolymer with both terminals blocked with dimethylvinylsiloxy groups and chlorodimethylsilane.

[2] Component (B)

The component (B) in the oxygen-curable silicone composition of the present invention is a silicone resin including (a) a unit having the formula (2) described below ($M^A$ unit), (b) an $R^1_3SiO_{1/2}$ unit (M unit), and (c) a $SiO_{4/2}$ unit (Q unit) as constitutive units and having, per molecule, at least one Si—OH group.

[Chem. 6]

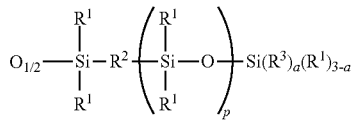

(2)

In the formula, $R^1$ and $R^2$ are as described above, $R^3$ each independently represents an acryloyloxyalkyl group, methacryloyloxyalkyl group, acryloyloxyalkyloxy group, or methacryloyloxyalkyloxy group (the alkyl group of $R^3$ is the same as that of $R^1$), p represents a number satisfying $0 \leq p \leq 10$, and a represents a number satisfying $1 \leq a \leq 3$.

The silicone resin of the component (B) has a molar ratio of [total of (a) $M^A$ unit and (b) M unit]/[(c) Q unit] of 0.4 to 1.2. If the molar ratio is less than 0.4, the composition has very high viscosity, and if the molar ratio is more than 1.2, the mechanical characteristics of the cured product may deteriorate.

The molar ratio is preferably 0.6 to 1.2 in consideration of setting the viscosity of the composition and the mechanical properties of the cured product in further appropriate ranges.

In addition, the molar ratio of the $M^A$ unit and the M unit can be set to adjust the rubber physical properties of the cured product. The higher the ratio of the $M^A$ unit is, the higher the hardness of the cured product tends to be. However, the ratio of $M^A$ unit: M unit is preferably 0.01 to 1:1, and more preferably 0.05 to 0.5:1 in consideration of strength that does not cause brittleness.

The content of the (c) Q unit is preferably 5 mol % or more, more preferably 10 to 95 mol %, and particularly preferably 20 to 60 mol % per total siloxane units in the silicone resin of the component (B).

The silicone resin of the component (B) preferably has a weight average molecular weight in the range of 500 to 100,000 in consideration of isolation and purification. The weight average molecular weight is a polystyrene-equivalent value obtained by gel permeation chromatography (solvent: THF).

The component (B) is to have, per 100 g, 0.005 mol or more of a Si—OH group, and particularly preferably has, per 100 g, 0.007 to 0.03 mol of the Si—OH group.

The Si—OH group that is not involved in the condensation in the silicone resin can activate the component (C) to improve the curability at room temperature remarkably, but if the amount of the Si—OH group is less than 0.005 mol per 100 g of the component (B), the component (C) cannot be sufficiently activated.

Such a silicone resin can be produced with a known method. For example, alkoxysilane compounds as the respective unit sources are combined so that the product to be obtained has a desired unit ratio, and subjected to (co-)hydrolytic condensation in the presence of an acid to produce the silicone resin.

The compounding amount of the component (B) is 1 to 1,000 parts by weight, preferably 5 to 500 parts by weight, and more preferably 10 to 200 parts by weight per 100 parts by weight of the component (A). If the compounding amount of the component (B) is less than 1 part by weight, the target curability may not be obtained, and if the compounding amount is more than 1,000 parts by weight, the composition has significantly high viscosity and becomes difficult to handle.

The component (B) may be used singly or in combination of two or more kinds thereof.

[3] Component (C)

The component (C) in the oxygen-curable silicone composition of the present invention is an organoborane complex that has the following formula (3) and is capable of generating an active radical species that acts as a polymerization initiator under the presence of oxygen.

[Chem. 7]

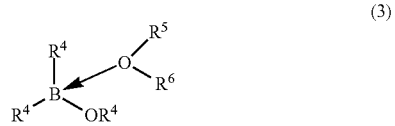

(3)

In the formula (3), $R^4$ each independently represents a monovalent hydrocarbon group having 1 to 10 carbon atoms, $R^5$ and $R^6$ each independently represent a monovalent hydrocarbon group having 1 to 10 carbon atoms, and $R^5$ and $R^6$ may bond to form a divalent linking group.

Specific examples of the monovalent hydrocarbon group having 1 to 10 carbon atoms represented by $R^4$ include alkyl groups having 1 to 10 carbon atoms, such as methyl, ethyl, n-propyl, n-butyl, n-pentyl, n-hexyl, and n-octyl groups; alkenyl groups having 2 to 10 carbon atoms, such as vinyl, allyl (2-propenyl), 1-butenyl, and 1-octenyl groups; and aryl groups having 6 to 10 carbon atoms, such as phenyl and naphthyl groups.

Some or all of hydrogen atoms on these groups may be substituted by halogen atoms (for example, chlorine atom, bromine atom, fluorine atom).

In particular, $R^4$ is preferably an alkyl group, and more preferably a methyl group or ethyl group, and a combination is even more preferable in which $R^4$ bonded to the oxygen atom is a methyl group, and $R^4$ bonded to the boron atom is an ethyl group.

Examples of the monovalent hydrocarbon groups having 1 to 10 carbon atoms represented by $R^5$ and $R^6$ include the same groups as the monovalent hydrocarbon groups described as examples of $R^3$ above. Specific examples of the divalent linking group (that is, cyclic structure) in which $R^5$ and $R^6$ are bonded include straight-chain, branched, or cyclic alkylene groups having 1 to 10 carbon atoms, such as methylene, ethylene, propylene, trimethylene, pentamethylene, hexamethylene, heptamethylene, octamethylene, nonamethylene, and decamethylene groups; and arylene groups having 6 to 10 carbon atoms, such as phenylene and naphthylene groups.

In particular, $R^5$ and $R^6$ are preferably bonded to form an alkylene group as the divalent linking group, and $R^5$, $R^6$, and an oxygen atom more preferably form a tetrahydrofuran (THF) ring as the cyclic structure.

Specific examples of the component (C) include methoxydiethylborane (MDEB)-THF complex.

The addition amount of the component (C) is 0.01 to 20 parts by weight, preferably 0.05 to 10 parts by weight, and more preferably 0.05 to 5 parts by weight per 100 parts by weight of the component (A). If the addition amount is less than 0.01 parts by weight, the curability is insufficient, and if the addition amount is more than 20 parts by weight, handling may become difficult due to an increase in curing rate, or the physical properties of a cured product to be obtained may deteriorate.

[4] Other Components

In addition to the above-described essential components (A) to (C), other additives can be blended with the oxygen-curable silicone composition of the present invention as necessary. Examples of the additives include fillers for reinforcement, adjustment of viscosity, improvement in heat resistance, and improvement in flame retardancy, such as titanium oxide, iron oxide, aluminum oxide, calcium carbonate, and magnesium carbonate, silane coupling agents, polymerization inhibitors, antioxidants, and light stabilizers.

The composition of the present invention can also be used after being appropriately mixed with another resin composition.

To the oxygen-curable silicone composition of the present invention, a (meth)acrylate compound free of a siloxane structure may be added for the purpose of improving the hardness of a cured product to be obtained.

Specific examples of the monofunctional (meth)acrylate compound free of a siloxane structure include isoamyl acrylate, lauryl acrylate, stearyl acrylate, ethoxy-diethylene glycol acrylate, methoxy-triethylene glycol acrylate, 2-ethylhexyl-diglycol acrylate, phenoxyethyl acrylate, phenoxydiethylene glycol acrylate, tetrahydrofurfuryl acrylate, and isobornyl acrylate. These compounds may be used singly or in combination of two or more kinds thereof. Among these compounds, isobornyl acrylate is preferable.

Specific examples of the multifunctional (meth)acrylate compound free of a siloxane structure include triethylene glycol diacrylate, polytetramethylene glycol diacrylate, neopentyl glycol diacrylate, 1,6-hexanediol diacrylate, dimethylol-tricyclodecane diacrylate, trimethylolpropane triacrylate, and pentaerythritol tetraacrylate. These compounds may be used singly or in combination of two or more kinds thereof. Among these compounds, dimethylol-tricyclodecane diacrylate is preferable.

The compounding amount of each of these (meth)acrylate compounds to be used is preferably 1 to 1,000 parts by weight, and more preferably 1 to 100 parts by weight per 100 parts by weight of the component (A). If the compounding amount is in such a range, a cured product having further excellent hardness can be obtained.

The oxygen-curable silicone composition of the present invention can be produced by mixing the components (A) to (C) and the other components used as necessary in the absence of oxygen, and, for example, stirring the resulting mixture. Note that any freely selectable component may be divided into two liquids that are to be mixed before use.

The viscosity of the oxygen-curable silicone composition of the present invention is not particularly limited, and is preferably 0.1 to 50 mPa·s, and more preferably 1 to 20 mPa·s at 25° C. The viscosity is a value measured with a rotational viscometer.

The oxygen-curable silicone composition of the present invention rapidly cures upon exposure to an oxygen-containing environment. The curing is desirably performed in the atmosphere.

The curing time is preferably 30 minutes or more, and more preferably 1 hour or more in a case where, for example, the composition of the present invention is formed into a sheet of approximately 2.0 mm thick.

The cured product obtainable from the oxygen-curable silicone composition of the present invention preferably has a hardness of 1 or more and less than 90 (Type A), and more preferably 10 or more and less than 85 (Type A), and preferably has a tensile strength of 0.8 MPa or more, and more preferably 1.0 MPa or more.

These values are measured in accordance with JIS-K 6249: 2003. The content of the component (B) can be set to adjust the hardness.

EXAMPLES

Hereinafter, the present invention is more specifically described with reference to Examples and Comparative Examples, but the present invention is not limited to these Examples.

In Examples described below, the viscosity of the composition is a value measured using a rotational viscometer at 25° C. $^{29}$Si-NMR was measured to calculate the amount of Si—OH.

[1] Production of Silicone Composition and Cured Product of Same

Examples 1 to 4 and Comparative Examples 1 to 3

The components (A) to (C) described below were mixed in compounding amounts (parts by weight) listed in Table 1 to prepare silicone compositions.

(A-1): Organopolysiloxane represented by the following formula produced with the above-described method

[Chem. 8]

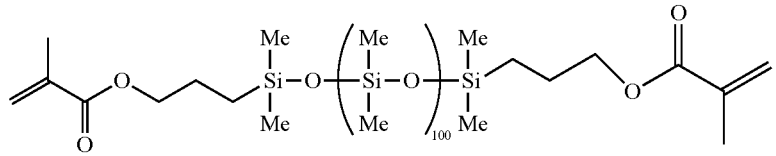

(A-2): Organopolysiloxane represented by the following formula produced with the above-described method

[Chem. 9]

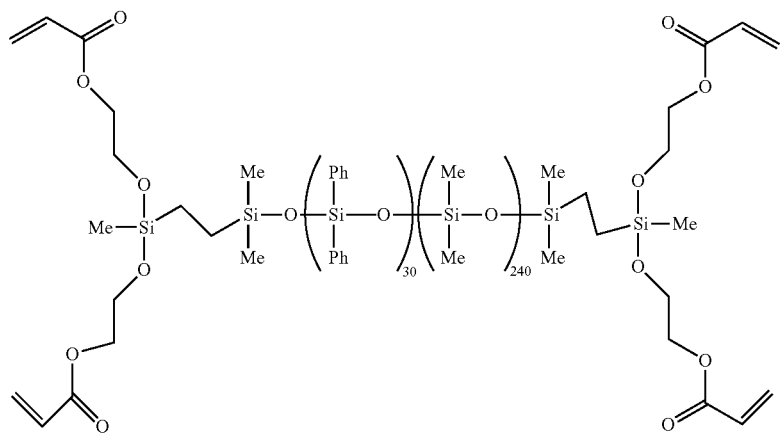

In the formula, order of arrangement of siloxane units in parentheses is freely selectable.

Component (B)

(B-1): Silicone resin including constitutive units having a molar ratio of the unit represented by the following formula: $Me_2ViSiO_{1/2}$ unit (Vi represents a vinyl group):$Me_3SiO_{1/2}$ unit:$SiO_2$ unit=0.14:0.03:0.67:1.00 (amount of Si—OH: 0.016 mol/100 g, numerical average molecular weight: 5,700)

[Chem. 10]

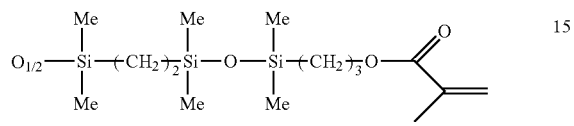

(B-2): Silicone resin including constitutive units having a molar ratio of $Me_2ViSiO_{1/2}$ unit:$Me_3SiO_{1/2}$ unit:$SiO_2$ unit=0.17:0.67:1.00 (amount of Si—OH:0.016 mol/100 g, numerical average molecular weight: 5,700)

Component (C)

(C-1): Methoxydiethylborane (MDEB)-THF complex (50% THF solution, manufactured by BASF SE)

TABLE 1

|  |  |  | Example | | | | Comparative Example | | |
|---|---|---|---|---|---|---|---|---|---|
|  |  |  | 1 | 2 | 3 | 4 | 1 | 2 | 3 |
| Composition (part by weight) | Component (A) | A-1 | 50 | — | — | — | 100 | 50 | — |
|  |  | A-2 | — | 80 | 60 | 60 | — | — | 50 |
|  | Component (B) | B-1 | 50 | 20 | 40 | 40 | — | — | — |
|  |  | B-2 | — | — | — | — | — | 50 | 50 |
|  | Component (C) | C-1 | 1.0 | 1.0 | 0.3 | 0.5 | 1.0 | 1.0 | 1.0 |

The silicone composition prepared in each of Examples and Comparative Examples described above was poured into a mold, a Teflon (registered trademark) sheet was placed on the mold, and the mold was allowed to stand in the atmosphere at 23° C. for 4 hours to obtain a cured sheet having a thickness of 2.0 mm. The hardness, the tensile strength, the elongation, and the density after curing of the obtained cured sheet were measured in accordance with JIS-K 6249:2003. Table 2 shows the results.

TABLE 2

|  | Example | | | | Comparative Example | | |
|---|---|---|---|---|---|---|---|
|  | 1 | 2 | 3 | 4 | 1 | 2 | 3 |
| Viscosity (mPa · s) | 3.2 | 3.3 | 4.6 | 4.4 | 0.2 | 2.0 | 9.0 |
| Hardness (Type A) | 63 | 34 | 57 | 50 | Not cured | 24 | 20 |
| Tensile strength (MPa) | 2.5 | 2.0 | 3.6 | 2.4 |  | 0.4 | 0.6 |
| Elongation (%) | 40 | 60 | 60 | 40 |  | 70 | 80 |
| Density (g/cm³) | 1.07 | 1.05 | 1.07 | 1.06 |  | 1.07 | 1.07 |

As shown in Table 2, it is found that the oxygen-curable silicone composition of the present invention prepared in Examples 1 to 4 cures at 23° C. to give a cured product having a tensile strength of 1.0 MPa or more. Meanwhile, it is found that the composition free of the component (B) in Comparative Example 1 does not cure at 23° C. for 4 hours. Furthermore, it is found that in Comparative Examples 2 and 3 in which the component (B-2) free of a (meth)acryloyloxy-containing group was used in place of the component (B) of the present invention, a cured product having a sufficient tensile strength is not obtained.

The invention claimed is:

1. An oxygen-curable silicone composition comprising:
   (A) 100 parts by weight of an organopolysiloxane having the general formula (1) described below:

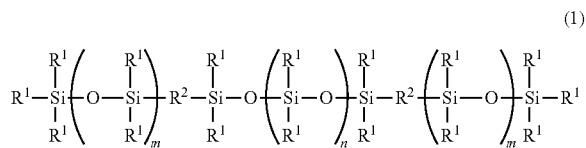

wherein $R^1$ each independently represents an alkyl group having 1 to 10 carbon atoms, alkenyl group having 2 to 10 carbon atoms, aryl group having 6 to 10 carbon atoms, acryloyloxy group, methacryloyloxy group, acryloyloxyalkyl group, methacryloyloxyalkyl group, acryloyloxyalkyloxy group, or methacryloyloxyalkyloxy group provided that one molecule of the organopolysiloxane includes at least one group selected from acryloyloxy group, methacryloyloxy group, acryloyloxyalkyl group, methacryloyloxyalkyl group, acryloyloxyalkyloxy group, and methacryloyloxyalkyloxy group, $R^2$ each independently represents an oxygen atom, alkylene group having 1 to 10 carbon atoms, or arylene group having 6 to 10 carbon atoms, and m and n satisfy 1≤m+n≤1,000, where m and n represent numbers that are 0 or more, respectively, but are not simultaneously 0;

(B) 1 to 1,000 parts by weight of a silicone resin including (a) a unit having the formula (2) described below, (b) an $R^1{}_3SiO_{1/2}$ unit, and (c) a $SiO_{4/2}$ unit as constitutive units, having a molar ratio of a total of the unit (a) and the unit (b) to the unit (c) in a range of 0.4 to 1.2, and having 0.005 mol or more of a Si—OH group per 100 g of the silicone resin:

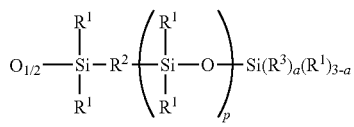

(2)

wherein $R^1$ and $R^2$ are as described above, $R^3$ each independently represents an acryloyloxyalkyl group, methacryloyloxyalkyl group, acryloyloxyalkyloxy group, or methacryloyloxyalkyloxy group, p represents a number satisfying 0≤p≤10, and a represents a number satisfying 1≤a≤3; and (C) 0.01 to 20 parts by weight of an organoborane complex having the formula (3) described below:

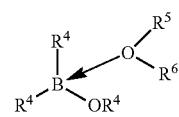

(3)

wherein $R^4$ each independently represents a monovalent hydrocarbon group having 1 to 10 carbon atoms, $R^5$ and $R^6$ each independently represent a monovalent hydrocarbon group having 1 to 10 carbon atoms, and $R^5$ and $R^6$ may bond to form a divalent linking group.

2. The oxygen-curable silicone composition of claim 1, wherein the silicone resin of the component (B) has 0.007 to 0.03 mol of the Si—OH group per 100 g of the silicone resin.

3. A cured product of the oxygen-curable silicone composition of claim 1.

4. A cured product of the oxygen-curable silicone composition of claim 2.

* * * * *